United States Patent
Nguyen et al.

(10) Patent No.: US 9,871,921 B2
(45) Date of Patent: *Jan. 16, 2018

(54) METHOD AND APPARATUS FOR DIVERTING CALLERS TO WEB SESSIONS

(71) Applicant: 24/7 CUSTOMER, INC., Campbell, CA (US)

(72) Inventors: Patrick Nguyen, Alameda, CA (US); Matthew Oshry, Albany, CA (US); Michael Bodell, Santa Clara, CA (US)

(73) Assignee: 24/7 CUSTOMER, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/088,069

(22) Filed: Mar. 31, 2016

(65) Prior Publication Data

US 2017/0026517 A1    Jan. 26, 2017

Related U.S. Application Data

(63) Continuation of application No. 13/923,190, filed on Jun. 20, 2013, now Pat. No. 9,325,845.

(60) Provisional application No. 61/662,492, filed on Jun. 21, 2012.

(51) Int. Cl.
| | |
|---|---|
| *H04M 3/00* | (2006.01) |
| *H04M 5/00* | (2006.01) |
| *H04M 1/64* | (2006.01) |
| *H04M 3/51* | (2006.01) |
| *H04M 7/00* | (2006.01) |
| *H04L 29/08* | (2006.01) |
| *H04W 4/20* | (2009.01) |

(52) U.S. Cl.
CPC ........ *H04M 3/5191* (2013.01); *H04L 67/146* (2013.01); *H04M 3/5141* (2013.01); *H04M 3/5166* (2013.01); *H04M 7/0027* (2013.01); *H04W 4/20* (2013.01)

(58) Field of Classification Search
CPC ... H04M 7/003; H04M 3/5183; H04M 3/5191
USPC .......... 379/265.09, 211.01, 221.01; 709/206; 455/414.1
See application file for complete search history.

(56) References Cited

U.S. PATENT DOCUMENTS

| | | |
|---|---|---|
| 7,917,581 B2 | 3/2011 | Moore et al. |
| 8,036,347 B1 | 10/2011 | Kanade |
| 8,509,416 B2 | 8/2013 | Merino Gonzalez et al. |
| 9,092,793 B2 * | 7/2015 | Altberg .................. G06Q 30/02 |
| 2006/0122840 A1 | 6/2006 | Anderson et al. |
| 2009/0003579 A1 | 1/2009 | Singh et al. |
| 2009/0149158 A1 | 6/2009 | Goldfarb et al. |
| 2010/0029249 A1 | 2/2010 | Bilstad et al. |
| 2010/0114822 A1 | 5/2010 | Pollock et al. |
| 2013/0124641 A1 | 5/2013 | Ryabchun et al. |

FOREIGN PATENT DOCUMENTS

EP    2101470 A1    9/2009

* cited by examiner

*Primary Examiner* — Thjuan K Addy
(74) *Attorney, Agent, or Firm* — Perkins Coie LLP

(57) ABSTRACT

A customer support system diverts a customer to an integrated support service to serve the customer better in situations where the use of a single mode of interaction is insufficient. Embodiments of the invention find use where an email or SMS is sent to a customer's smart devices with a link to visual content which helps customer better understand the information.

20 Claims, 9 Drawing Sheets

METHOD AND APPARATUS FOR DIVERTING CALLERS TO WEB SESSIONS

CROSS REFERENCE TO RELATED APPLICATIONS

This application is a continuation of U.S. patent application Ser. No. 13/923,190, filed Jun. 20, 2013, which claims the benefit of U.S. provisional patent application Ser. No. 61/662,492, filed Jun. 21, 2012, which is incorporated herein in its entirety by this reference thereto.

BACKGROUND OF THE INVENTION

Technical Field

The invention relates to customer care support systems. More particularly, the invention relates to customer care support services that use multiple concurrent channels to serve a customer.

Description of the Background Art

The customer service market is shaped by the needs and behaviors of both customers and businesses. Over the past several years, businesses have increasingly focused on improving customer support. Customers have more control of the customer service experience than ever before, and increased competition means that customers do not hesitate to abandon a business over poor service. Companies realize this and continue to adopt customer support as a sustainable competitive advantage. When communicating with a customer using only voice, such as through a phone call, it can be difficult to render visual, complex, or lengthy content. When information is visual, a customer service agent or Interactive voice response (IVR) system may have difficulty conveying the right words and expressions to make the description understandable to the customer.

When a number of items are presented, the customer may need the information to be repeated, or the customer may need to make notes to recall items and properly understand the content. In these situations, the use of interactive systems which can visually display the information to the customer is beneficial.

SUMMARY OF THE INVENTION

Embodiments of the invention provide a method and apparatus with which a customer interaction that begins in a non-visual channel, such as a phone call, is supplemented with a visual channel, such as a Web session, to communicate richer information to the customer.

DETAILED DESCRIPTION OF THE INVENTION

The embodiments of the invention set forth herein disclose a method and system that intelligently supplements or diverts a customer call to a linked Web session. Embodiments of the invention disclosed herein enable a customer care support (CCS) facility to deliver information visually on customer connected devices. The CCS can comprise an interactive voice response (IVR) system, voice agents, or any other automated or live system that relies primarily on non-visual communication. A connected device can be a mobile phone, laptop, PDA, tablet, or any other suitable equipment that provides access to networked services such as the Internet. A linked Web session between the CCS and customer is established by forwarding the corresponding Web links or content to the customer via SMS or email, by asking and/or instructing the customer to visit a personalized Web page, by opening a preconfigured Web page whenever the customer calls a predefined number, by a registered customer device initiating a linked session in response to the CCS request, or by the customer initiating a session on the customer's device and linking the session.

The embodiments of the invention disclosed herein further provide automated, as well as agent-guided, Web sessions. Embodiments of the invention enable the CCS to control rich content on the customer's device in a reliable way that reduces talk time and improves understandability, thereby improving customer satisfaction.

Regarding reliability and the customer experience, consider authentication. In embodiments of the invention, an improved customer experience is provided when the customer is authenticated during addition of a Web channel. For example, consider a phone call interaction that contains customer authentication. When a mobile Web experience is added to this existing phone call, authentication is achieved by virtue of the phone call continuing along with the Web interaction. Further, for security reasons the mobile Web experience lasts only for the duration of the call. In embodiments of the invention where the Web experience, e.g. desktop or laptop, is on a different device than the phone, authentication is achieved by sending email with a microsite URL to the registered email on account for the customer. Alternatively, a unique URL is provided to the customer on the phone call. This URL lasts only for the duration of the phone call.

Figure 1:
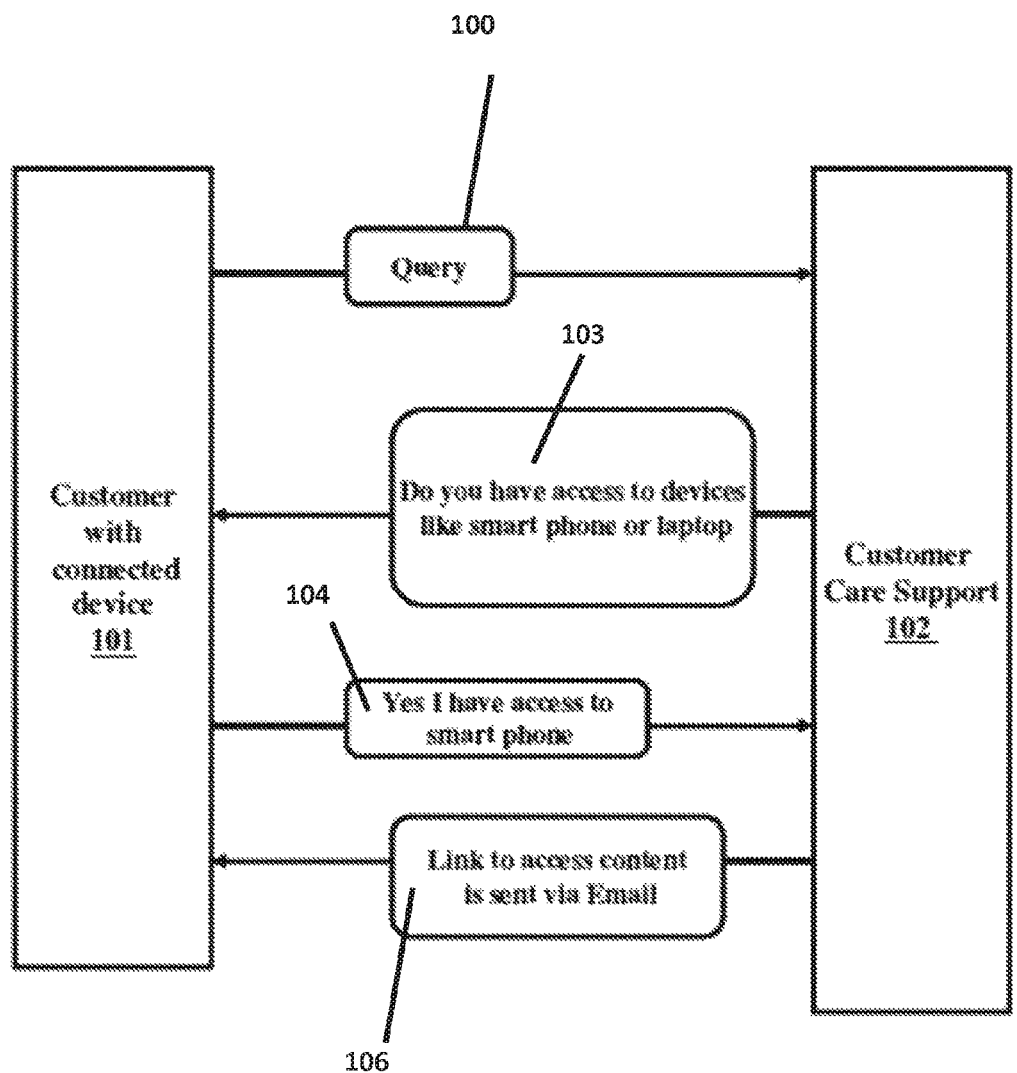
FIG. 1 is a block schematic diagram that depicts a system that intelligently diverts the customer to a linked Web session to provide a better service experience according to the invention.

FIG. 1 is a block schematic diagram that depicts a system that intelligently diverts the customer to a linked Web session to provide a better service experience according to the invention (for more details about linked Web sessions, see U.S. patent application Ser. No. 13/763,456, filed Feb. 8, 2013, which application is incorporated herein in its entirety by this reference thereto). In FIG. 1, a customer having a connected device 101 is in communication with a customer care support (CCS) facility 102. The customer and the CCS communicate with each other through various available communication networks. In one embodiment of the invention, the customer receives outbound alerts from the CCS and calls back to get information or to resolve the query. The CCS can comprise an IVR, voice agent, or any other automated or live system that relies primarily on non-visual communication at a customer care support center.

The customer posits a query to the CCS (100). The CCS either automatically detects the devices that a customer can access at the moment, checks with the customer on the devices that a customer can access at the moment (103, 104), or predicts the type of devices that customer can access based on previous interaction that the customer had with the CCS. If the customer can access any of the connected devices, such as a smart phone, iPad, laptop, PDA, or any other suitable device, then the CCS offers the customer the option of receiving service over a Web session, as well as voice, for example by sending an email link to the customer by which the customer can access additional content (106), if such service is required to communicate with the customer better.

If the customer opts for such integrated service then the CCS initiates a Web session and links it with the ongoing non-visual session in any of the following ways:

- The CCS sends a link to the customer by email, SMS, instant message, or any other digital communication that, when selected by the customer, initiates a linked session.
- The CCS plays a message that directs the customer to a personalized Web page that initiates a linked session, for example the CCS may tell the caller "Please go to xyz.com and enter your phone number," or "Please go to xyz.com and enter your special ID code: 1234," or "Please go to this Web page xyz.com/1234."
- The device used by the customer to place the phone call initiates a linked session in response to the CCS request. For example, the mobile device is configured by the wireless carrier or Internet service provider (ISP) to open a specific Web page based on the number called, e.g. calling the 800 number for XYZ triggers the mobile browser to open the page XYZ.com. In this case, the customer's mobile number is passed to this Web page in the request, or the page prompts the customer to enter his mobile number so that the two sessions can be linked.
- A device registered by the customer with the CCS initiates a linked session in response to the CCS request. For example, the customer has downloaded the XYZ company app on his mobile device and registered it with XYZ. The CCS sends a notification to the app, and upon the customer launching the app, the app makes a data request to XYZ to be linked to the CCS session
- The customer initiates a session on a mobile device and links it by entering identifying information. For example, the customer launches an app installed on his mobile device and is prompted for identifying information, such as his phone number or account number. The system then links that session with a recent or current CCS session for the same customer.

Regarding the integrated service above, consider the case of running state chart XML (SCXML) in a call control XML (CCXML) environment. CCXML is effective for call control and coordinating dialogs, but it is poor at state management and typically is not involved in user interactions or turns. SCXML is an emerging standard for capturing the semantics of state machines, but does not typically interact with phone calls or perform other call control work. Embodiments of the invention use an SCXML interpreter that is represented in JavaScript (JS), and execute the JS based interpreter in the context of a CCXML application and interpreter. In this way, user interaction and coordination of dialogs across a browser can be performed in SCXML, which is best suited for this purpose; while the call control and signaling to the voice browser over session initiation protocol (SIP) INFO can be performed by CCXML, which is what CCXML is best suited for. By combining two XML-based languages that would normally have an XML-based interpreter into one context one can author the application as if it was getting a real, fully functional XML-based interpreter, but this implementation abstracts the XML-based interpreter and allows one to combine both execution environments into the same interpreter.

In addition, one way to embed the SCXML interpreter into CCXML is to provide a cloud-based platform component that is the same for, and shared between, different applications and different clients. These CCXML pieces and the linking code between SCXML and CCXML thus provide a common multimodal platform component upon which all multimodal applications can be built. The SCXML, however, can be customized as appropriate for each journey and each application.

Regarding the last example above of an integrated service consider, also, multimodal interactions. Some applications use simultaneous voice and touch through an integrated application. But there do not exist in the market today applications that can coordinate different interpreters on different devices and move an interaction from one interpreter and/or channel to shared multiple interactions. There does not exist a real distributed multimodal application. To address this issue, embodiments of the invention use a cloud-based SCXML processor to coordinate, and start with a voice only voice browsing experience from a cloud-based voice XML (VXML) interpreter to combine a phone call and session with a mobile Web browser on the caller's phone or any other connected device with access to the Internet.

Amongst the novel aspects of this embodiment it is noted that the system starts purely in one mode, i.e. just VXML. The SCXML controller is only added when it is necessary to operate in a multimodal session. At such time as this occurs, the system joins the application session. The URL in the SMS that is then sent enables the customer's Web browser to access HTML visual content that is synced with the voice content. In particular in this approach, not only is it not necessary to begin the application with a visual browser, or even a multimodal controller from the start, but this solution can be added easily to existing voice applications.

In addition, in this embodiment of the invention the application is always able to interact by touch and also always able to interact by voice. There is no need for click-to-talk, i.e. the application can continuously listen. Inputs can be processed simultaneously, i.e. the customer can both gesture or type and talk at the same time, through multiple devices and across multiple browsers. This embodiment is also flexible because any Web browser, e.g. Chrome, Safari, Firefox, Opera, IE, etc., can fit in this environment, i.e. there is no special integration needed.

Regarding the integrated service above, consider also, routing. For tying events that contain Web links, a portion of the Web link URL identifies application servers that house stateful sessions. Link routing as disclosed herein provides a mechanism by which those servers can locate each other, such that live sessions can rendezvous. This linkage differs from other tying behavior herein because this embodiment of the invention ties servers with each other. Other ties link between user information spread across live sessions. This embodiment of the invention provides a mechanism with which computers can execute code for those live sessions to locate each other.

Figure 2:
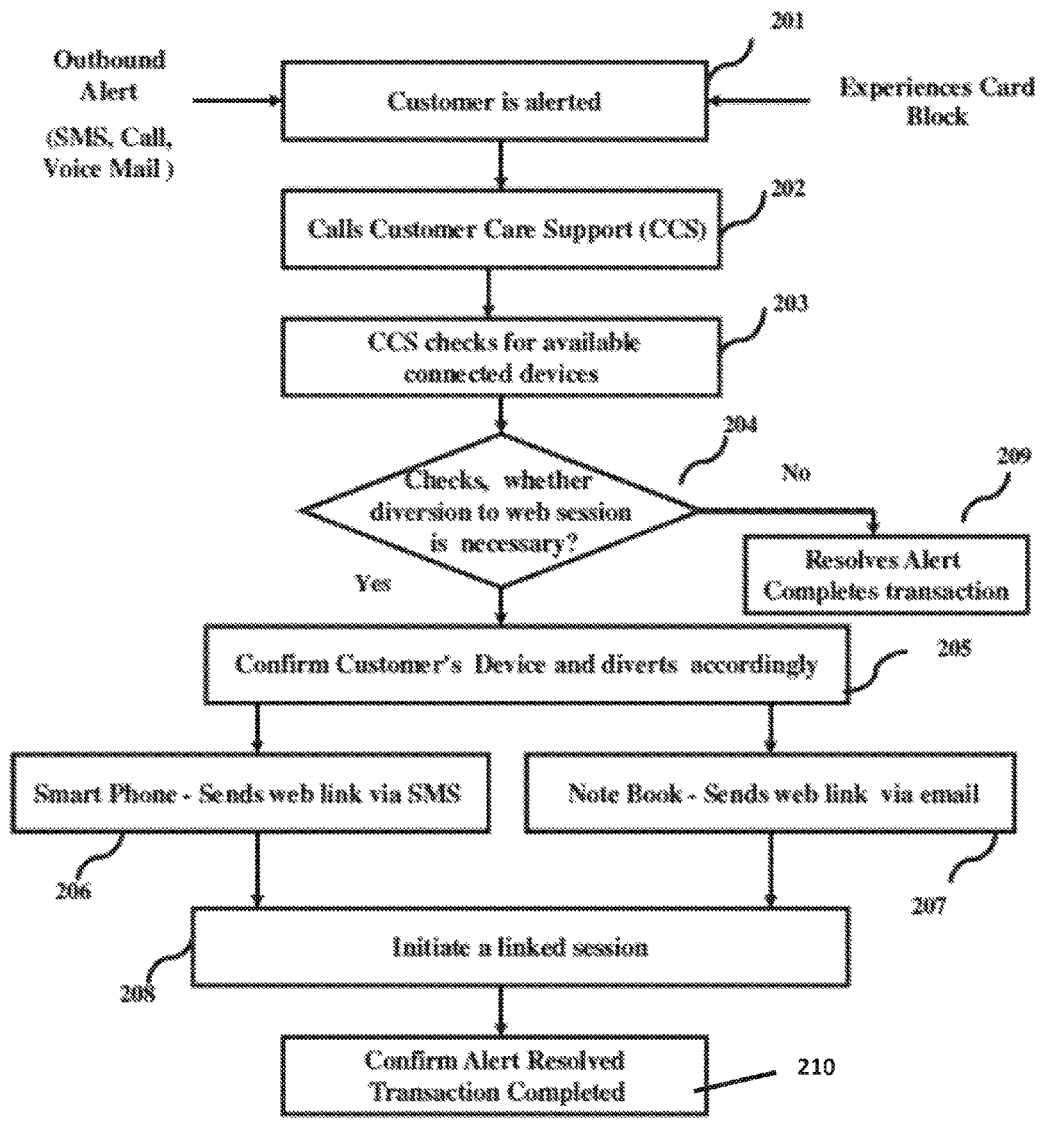
FIG. 2 is flow diagram showing a method for diverting callers to Web sessions according to the invention.

FIG. 2 is flow diagram showing a method for diverting callers to Web sessions according to the invention. In FIG. 2, the flow of events is shown for a customer whose credit card is blocked due to suspicious charges. Those skilled in the art will appreciate that this scenario is provided as an example and not by way of limitation, and that the invention will find use in many other situations.

The customer is alerted (201) about a blocked card through any of various communication media, such as SMS, email, call etc.; or the customer can experience 'card blocked' situation.

In response to such situation, the customer calls (202) customer care support to resolve the alert. Customer care support (CCS) can be interactive voice response (IVR) system, voice agent, etc. The CCS checks (203) for available connected devices that a user can access at the moment. The CCS then decides whether a diversion to a Web session is necessary (204), depending on the nature of content that the CCS has to use to support the customer.

In embodiments of the invention, data and context is exchanged between online channels to the agent. Interaction data and context captured during the customer experience is passed onto the agents via the following methods:

Based on the application path, the agent knows why the call is being transferred to an agent, e.g. for fraud alert the call is transferred to an agent only if the customer says "No" to the list of suspect charges. The call lands at the agent only when the customer has said "no."

Interaction data can also be bundled and passed to the contact center. The data includes interaction steps, time spent on each step, which modality was used, feedback information, and more. An interaction may be highly coupled and may include voice information and visual information that is used to communicate with a user. Various approaches may be used to transport voice and visual information to a user. For example, voice information may be transported via a landline telephone, cellphone, VoIP application, voice capture system, and so on. Visual information may be shown to the user via a wide range of devices that include some kind of display device including a smartphone, laptop computer, tablet, TV, mobile device, projector, and so on.

If the alert can be resolved (209) over the phone alone, then the CSS resolves the alert and the transaction is completed. If the customer can be better served using visual content, then the CSS confirms said customer's device and diverts the customer (205) accordingly in any of the ways discussed above. For example, if the customer has a smart phone, a Web link can be sent to the customer via SMS (206), which initiates a linked session (208) in which the customer can access the content.

In embodiments of the invention, the customer experience allows simultaneous phone channel and mobile Web touch interaction in at least the following scenarios:

Voice on one device and visuals on another device, e.g. a landline phone and a desktop or tablet; and Voice and visuals on the same device, e.g. a smartphone.

In embodiments of the invention, one or more of the following methods are used to deliver an optimal customer experience:

Carrier and device determination: Carrier and device information is procured when the call is first received at the data center. This information identifies whether the customer is a wireless phone user or a landline user.

Device information provides information such as phone model, data capability, SMS capability, and geo-location of the device.

Mapping: Visual maps are provided for enriched visual experience, e.g. a customer can see on a map where all of his last five credit card transactions took place.

Geo-location: The location of the customer can be used to provide contextual experience, e.g. an insurance company can show the location of repair garages in the vicinity.

Feedback: Both star rating and free text format feedback allows for in-call feedback at the end of the customer experience. This is a unique real-time visual mechanism to get feedback for a phone call experience.

UI driven experience: Discovery of what a customer can say is driven by the UI. Speech recognition prompts are open and visuals guide the customer.

Simultaneous Multimodal: A customer can either touch or speak at any time interrupting the other modality, e.g. if a prompt is being played and the expected input is either a touch or speech and the user touches the relevant part of the screen, the audio prompt stops playing.

With regard to FIG. 2, the customer can review and confirm the credit card charges on the Web session, or with the CCS over a voice call or via an IVR system. Thereafter, the alert is confirmed as resolved and the transaction is completed (210).

Alternatively, if the customer has a notebook or other computer, a Web link can be sent to the customer via email (207), which initiates a linked session (208) in which the customer can access the content. The customer can review charges and confirm the credit card charges on the Web session, or with the CSS over a voice call or via an IVR system. Thereafter, the alert is confirmed as resolved and the transaction is completed (210).

In another embodiment of the invention, the system depicted in FIG. 1 can be used to confirm authentication of phone callers when received by IVRs and voice agents. In certain cases where passwords are alphanumeric, it can be difficult to match such passwords using speech recognition, customers may not want to say passwords out loud and enterprises may not want agents to hear sensitive customer information, such as a Social Security Number (SSN) or passwords. In such situations where authentication is required, the system can hand off or divert the customer to an online or mobile Web session, where the authentication information can be entered. Once the information is securely entered, the IVR system or agent conversation can continue.

In other embodiments of the invention, the system can be used where customers spell names, account numbers, email addresses, etc., but the similarity in pronunciations of some letters in such case makes the recognition task harder for an IVR system or voice agents. In such situations during ongoing communication with an IVR system or voice agent, when confusing letters must be recognized, the system can hand off or divert the customer to an online or mobile Web session, where the letters, or the entire name or identifier, can be entered manually. Once the information is entered, the IVR system or live agent conversation can continue.

In another embodiment of the invention, the customer is diverted to a Web session and, at the same time, voice interaction is discontinued. This reduces costs incurred by an enterprise when live agents or an IVR system is used.

In other embodiments of the invention, the customer can start a chat session and place a phone call at the same time, and then enter identifying information that links the two, e.g.

the customer enters the phone number he is calling from in the chat session, or he enters his account number in both the chat session and the phone call. The chat session can then be used to enter information that is difficult to convey in the phone call, e.g. passwords or email addresses.

The embodiments disclosed herein can be implemented through at least one software program running on at least one hardware device that performs network management functions to control the elements. The blocks shown in FIGS. 1 and 2 include elements that can comprise any of a hardware device, a software module, or a combination of a hardware device and a software module.

Further Embodiments

Running SCXML in a CCXML environment. As discussed above, CCXML is effective for call control and coordinating dialogs, but it is poor at state management and typically is not involved in user interactions or turns. SCXML is an emerging standard for capturing the semantics of state machines, but does not typically interact with phone calls or perform other call control work. Embodiments of the invention use an SCXML interpreter that is represented in JavaScript (JS), and execute the JS based interpreter in the context of a CCXML application and interpreter. In this way, user interaction and coordination of dialogs across a browser can be performed in SCXML, which is best suited for this purpose; while the call control and signaling to the voice browser over session initiation protocol (SIP) INFO can be performed by CCXML, which is what CCXML is best suited for. By combining two XML-based languages that would normally have an XML-based interpreter into one context the author can author the application as if it was getting a real, fully functional XML-based interpreter, but the this implementation abstracts that and allows one to combine both execution environments into the same interpreter.

In addition, one way to embed the SCXML interpreter into CCXML is to provide a cloud-based platform component that is the same for, and shared between, different applications and different clients. These CCXML pieces and the linking code between SCXML and CCXML thus provide a common multimodal platform component upon which all multimodal applications can be built. The SCXML, however, can be customized as appropriate for each journey and each application.

Figure 3:
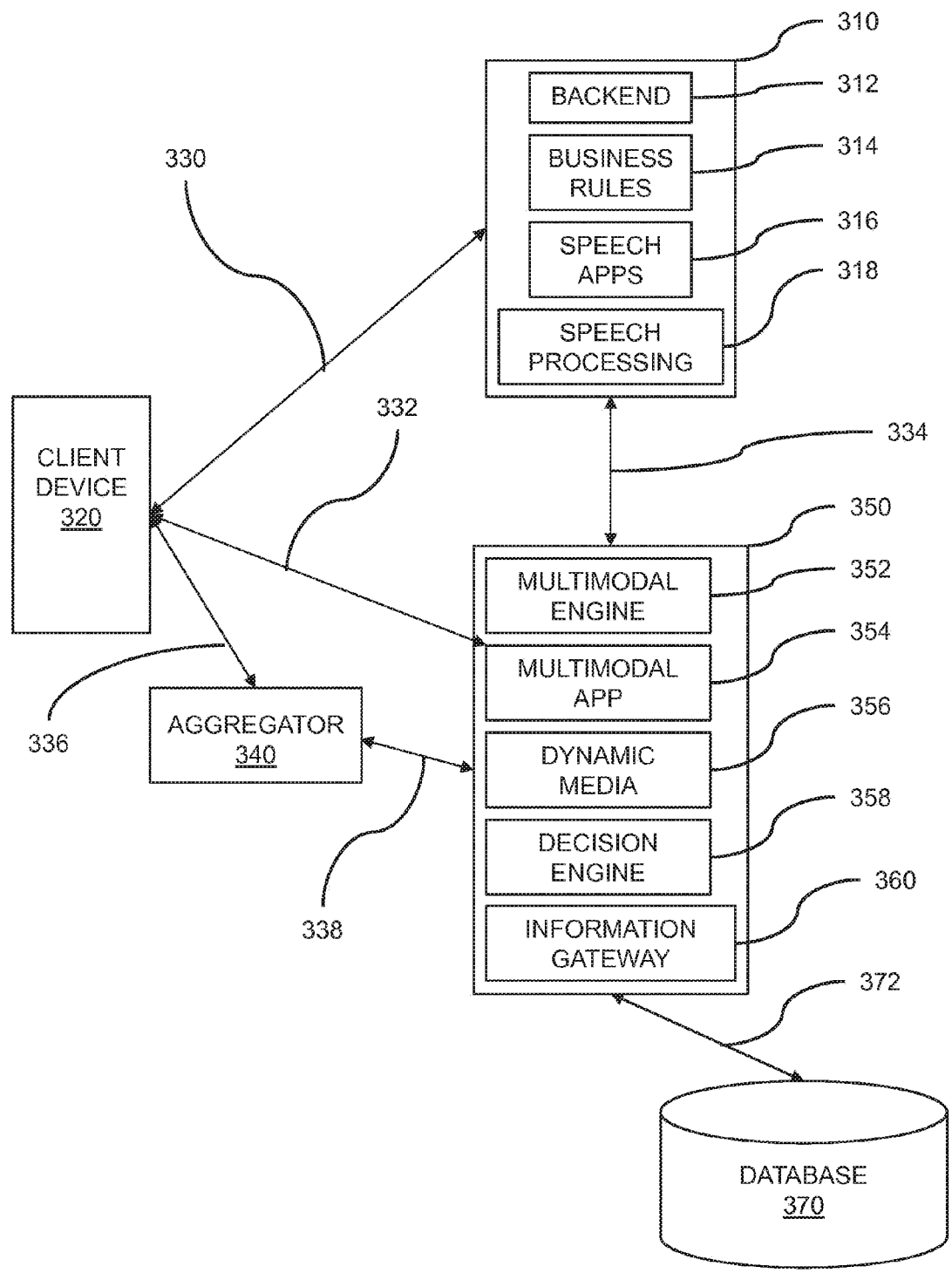
FIG. 3 is a block schematic diagram that shows a multimodal architecture according to the invention.

FIG. 3 is a block schematic diagram that shows a multimodal architecture according to the invention. In FIG. 3, a client device 320 (HTML browser) communicates via a communications link 330 with a speech-based system 310 (Voice Application Server (VAS)) that includes a backend facility 312, business rules 314, speech applications 316, and a speech processing engine 318.

The client device also communicates with a multimodal control system 350 (Call Control Application Server (CCAS)) via a communications link 332 and is communicatively coupled to the speech-based system via a communications link 334. An aggregator 340 is communicatively coupled between the client device and the multimodal system, via respective communications links 336, 338.

The multimodal system comprises a multimodal engine 352, a multimodal application 354, dynamic media 356, a decision engine 358, and an information gateway 360. A database 370 is communicatively coupled to the multimodal system via a communications link 372. For purposes of the discussion herein, a communications link is any mechanism for conveying information, signals, and the like from one facility to another. Facilities the are communicatively coupled may communicate with each other via such link. The communications link may couple remote facilities or it may be within a common siting.

An exemplary embodiment of the platform of FIG. 3 comprises an architecture having three main components:
1. The CCAS;
2. The VAS; and
3. The HTML browser.

The CCAS serves as the controller. The VAS and HTML browser serve as presentation components.

The following describes the flow between these components:
1. An inbound call from the user's device connects to a CCAS host.
2. The CCAS launches a CCXML application to handle the call. The CCXML application fetches an SCXML document describing the flow of the multimodal application. The CCXML application fetches an ECMAScript implementation of an SCXML engine and uses it to parse and execute the SCXML.
3. The SCXML Finite State Machine instructs the CCXML application to start an outbound dialog with a VAS. The CCAS connects to a VAS via SIP.
4. The VAS launches the VXML application and interacts with the user over RTP. The normal IVR call continues until the point that the IVR+mobile Web experience is to be offered. When that occurs the VXML application transitions to a special multimodal VXML page and sends the event to CCXML to begin the multimodal experience.
5. The VXML and CCXML applications communicate asynchronously via events sent across the signaling channel. The controller (SCXML) uses these events to determine if and when to start the visual modality (HTML) with the user, for example, by having the CCXML application send an SMS to the end user's smart device. The text message contains additional context, including the URL to the HTML application, the address of the CCAS, and the unique identifier of the CCAS session.
6. Upon receiving the SMS, the user launches the HTML application.
7. The HTML application sends events over HTTP to the CCXML session. The CCXML application injects these events into the SCXML engine. The SCXML engine controls the HTML browser through the CCAS over HTTP.

The CCAS remains in the signaling path (SIP) for the duration of the user session.

Authentication. As discussed above, an improved customer experience is provided when the customer is authenticated during addition of a Web channel. For example, the phone call interaction may start with customer authentication. When a mobile Web experience is added to this phone call, authentication is achieved by virtue of the phone call continuing along with the Web interaction. Further, for security reasons the mobile Web experience lasts only for the duration of the call. In embodiments of the invention where the Web experience, e.g. desktop or laptop, is on a different device than the phone, authentication is achieved by sending email with a microsite URL to the registered email on account for the customer. Alternatively, a unique URL is provided to the customer on the phone call. This URL lasts only for the duration of the phone call.

Interaction tracking. As discussed above with regard to multimodal interactions, some applications use simultaneous voice and touch through an integrated application. But there do not exist in the market today applications that can coordinate different interpreters on different devices and move an interaction from one interpreter and/or channel to shared multiple interactions. There does not exist a real distributed multimodal application. To address this issue, embodiments of the invention use a cloud-based SCXML processor to coordinate, and start with a voice only voice browsing experience from a cloud-based voice XML (VXML) interpreter to combine a phone call and session with a mobile Web browser on the caller's phone.

Amongst the novel aspects of this embodiment it is noted that the system starts purely in one mode, i.e. just VXML. The SCXML controller is only added when it is necessary to operate in a multimodal session. At such time as this occurs, the system joins the application session. The URL in the SMS that is then sent enables the customer's Web browser to access HTML visual content that is synced with the voice content. In particular in this approach, not only is it not necessary to begin the application with a visual browser, or even a multimodal controller from the start, but this solution can be added easily to existing voice applications.

In addition, in this embodiment of the invention the application is always able to interact by touch and also always able to interact by voice. There is no need for click-to-talk, i.e. the application can continuously listen. Inputs can be processed simultaneously, i.e. the customer can both gesture or type and talk at the same time, through multiple devices and across multiple browsers. This embodiment is also flexible because any Web browser, e.g. Chrome, Safari, Firefox, Opera, IE, etc., can fit in this environment, i.e. there is no special integration needed.

Routing. As discussed above with regard to routing, for tying events that contain Web links, a portion of the Web link URL identifies application servers that house stateful sessions. Link routing as disclosed herein provides a mechanism by which those servers can locate each other, such that live sessions can rendezvous. This linkage differs from other tying behavior herein because this embodiment of the invention ties servers with each other. Other ties link between user information spread across live sessions. This embodiment of the invention provides a mechanism with which computers can execute code for those live sessions to locate each other.

Data between channels. As discussed above, data and context is exchanged between online channels to the agent. Interaction data and context captured during the customer experience is passed onto the agents via the following methods:
  Based on the application path, the agent knows why the call is being transferred to an agent, e.g. for fraud alert the call is transferred to an agent only if the customer says "No" to the list of suspect charges. The call lands at the agent only when the customer has said "no."
  Interaction data can also be bundled and passed to the contact center. The data includes interaction steps, time spent on each step, which modality was used, feedback information, and more. An interaction may be highly coupled and may include voice information and visual information that is used to communicate with a user. Various approaches may be used to transport voice and visual information to a user. For example, voice information may be transported via a landline telephone, cellphone, VoIP application, voice capture system, and so on. Visual information may be shown to the user via a wide range of devices that include some kind of display device including a smartphone, laptop computer, tablet, TV, mobile device, projector, and so on.

Phone call and screen. As discussed above, the customer experience allows simultaneous phone channel and mobile Web touch interaction in at least the following scenarios:
  Voice on one device and visuals on another device, e.g. a landline phone and a desktop or tablet; and
  Voice and visuals on the same device, e.g. a smartphone.

In embodiments of the invention, one or more of the following methods are used to deliver an optimal customer experience:
  Carrier and device determination: Carrier and device information is procured when the call is first received at the data center. This information identifies whether the customer is a wireless phone user or a landline user. Device information provides information such as phone model, data capability, SMS capability, and geo-location of the device.
  Mapping: Visual maps are provided for enriched visual experience, e.g. a customer can see on a map where all of his last five credit card transactions took place.
  Geo-location: The location of the customer can be used to provide contextual experience, e.g. an insurance company can show the location of repair garages in the vicinity.
  Feedback: Both star rating and free text format feedback allows for in-call feedback at the end of the customer experience. This is a unique real-time visual mechanism to get feedback for a phone call experience.
  UI driven experience: Discovery of what a customer can say is driven by the UI. Speech recognition prompts are open and visuals guide the customer.
  Simultaneous Multimodal: A customer can either touch or speak at any time interrupting the other modality, e.g. if a prompt is being played and the expected input is either a touch or speech and the user touches the relevant part of the screen, the audio prompt stops playing.

Authoring. Embodiments of the invention provide techniques that make authoring multimodal applications tenable, e.g.:
  By authoring all components of the herein disclosed diversion mechanism in standard XML language and JavaScript, e.g. HTML+JS, SCXML+JS, VXML+JS, JS code can be shared between the components. The same JS objects and methods for dealing with a payment object, a bank account, a charge, or a log object can be shared across interpreters. i.e. it is written once and used across multiple browsers in multiple modes.
  By using standard VXML, the distributed multimodal application can be instantiated through a simple subdialog call from an existing voice only application. All of the necessary state transfer, i.e. backend integration, can be skipped because the subdialog allows the passing of information in VXML through JS to the multimodal experience, and also returns data back out as a result of the subdialog when the multimodal experience is finished. Skipping any backend integration and integrating cleanly through the subdialog allows the application to be added to any existing application and, moreover, development of the multimodal components can be performed by one team or company, while the development of the initial voice only application can be performed by another.
  One problem that occurs when coordinating a distributed multimodal application that can take inputs from multiple different browsers is event ordering and processing. If every speech interaction can result in a nomatch event, and many screens can also have an OK button pressed, there is a worry that the person may have a nomatch prior to the OK, but have the nomatch processed in the next state. One solution to this problem is to combine the name of the state with that of the event so that one knows if the nomatch event was for the summary screen or the confirmation screen because the SCXML event matching scheme ignores events that were not raised based on the current state, i.e. old events from previous states become automatically named differently and automatically ignored.

In transitioning a call to be answered by CCXML instead of VXML it is necessary to change the URL that is loaded from that which serves VXML content to one that serves CCXML content. Because rolling out the change of the routing of the phone number to CCXML and the content that the phone number needs to load takes some time and cannot be tightly coordinated, and because it is also desirable to have a working roll back failsafe, it is necessary to encode both the VXML content and the CCXML content into the same URL such that it works correctly in all combinations of the call routed to VXML or CCXML, and content loading getting both the old URL or the new URL. To solve this, embodiments of the invention allow the CCXML to load based on a URL query param, if necessary. In this way, the VXML is loaded using the normal part of the URL and the CCXML loads from the query param, if present, and the normal URL if not.

When integrating from a voice only application it is desirable that there be one URL to which there is a subdialog, but it is also desirable to be able to change the content at the URL. Moreover, the content should load differently in test and development than in production. Additionally, it is important to be able to perform different experimental flights to allow A/B testing. One embodiment of the invention provides a wrapper layer in VXML that chooses the right service (test/dev/production) based on a number of attributes, including the phone number from which the customer is calling, the phone number that the customer dialed, etc. The service selector wrapper also performs experimental flight choices and performs its own nested subdialog to the correct code version. This level of subdialog decomposition provides flexibility to be able to perform effective development and effective NB experimentation of the herein disclosed multimodal applications.

When moving from a voice only to a multimodal solution it is helpful to compare the effectiveness of the multimodal application with the effectiveness of the voice only application. An embodiment of the invention conveys all of the logging information from the visual side on the mobile browser and from the multimodal coordinator, i.e. the SCXML cloud, places the data into a voice browser, logs the data through the normal voice browser channels, and returns the log data to the VXML application as part of the return from the subdialog. By doing this, a normal voice only reporting platform can be used to perform normal log analysis, trend spotting, task completion, and other log aggregation and analysis of the multimodal application. It is also possible for a client to use a normal voice only provisioning and configuration system and to post the log content to their own proprietary logging analytics platform, where they could accurately compare how much better the multimodal solution is to the original voice only solution that is being augmented.

Log packing algorithm. A multimodal application controller allows the application to log application specific events. In the controller running on top of CCXML, all logs go to the voice application server (VAS) via a SIP INFO message. These logs are sent in a URL-encoded string format. There are multiple types of logs, including plain events, tasks, and vendor/client specific events, each with its own formatting. The SIP INFO message has a limited size, governed by the MTU, which means it is not possible to send a large message via SIP INFO. At the same time, sending one log in each SIP INFO message is not efficient due to overhead in the SIP INFO message header.

In embodiments of the invention, the application controller packs the logs into as few groups as possible. The byte size of each group is no larger than the maximum safe log size, defined below. When the size exceeds the safe limit, the next log item is pushed to the next group of logs. At the end of the packing, the controller sends out only one SIP INFO message for each log group, thus saving the bandwidth within maximum transmission unit (MTU).

In embodiments of the invention, the Maximum Safe Log Size is defined as:

(MTU−(SIP INFO message header size)−(log command overhead)−safetyBuffer). In other words, the Maximum Safe Log Size may be defined as the maximum transmission unit (MTU) size, minus the header size of the session initiation protocol (SIP) info message, minus any overhead associated with log commands, minus a reserve or safety factor size (safetyBuffer). The resulting Maximum Safe Log Size value is used for the packing of the logs into as few groups as possible.

The log command overhead is the fixed number of bytes needed to represent the log groups in the SIP INFO message, regardless of the actual log content. This is application specific. Adjusting the safetyBuffer, which is application specific, ensures the entire logs fit within one SIP INFO message.

An example of the algorithm is as follows:
1. Queue all application logs, with any type, to be sent.
2. When it is time to send the logs over, iterate through all logs for each log type. For the first log item in the set, start a new log group.
3. Check if the next log item still fits the group. If yes, then add it to the group, then repeat step (3). If not, go to step (4).
4. The group is now full, so queue this group into the logCommand queues.
5. Start a new log group if there is still more item to pack, then repeat step (3). Otherwise, go to step (6).
6. Given the resulting logCommand queues, send each log group in the queue over to VAS via a SIP INFO message.
7. The receiver unpacks each of the log groups received, and logs each log item inside the group.

Call Diversion

Figure 4:
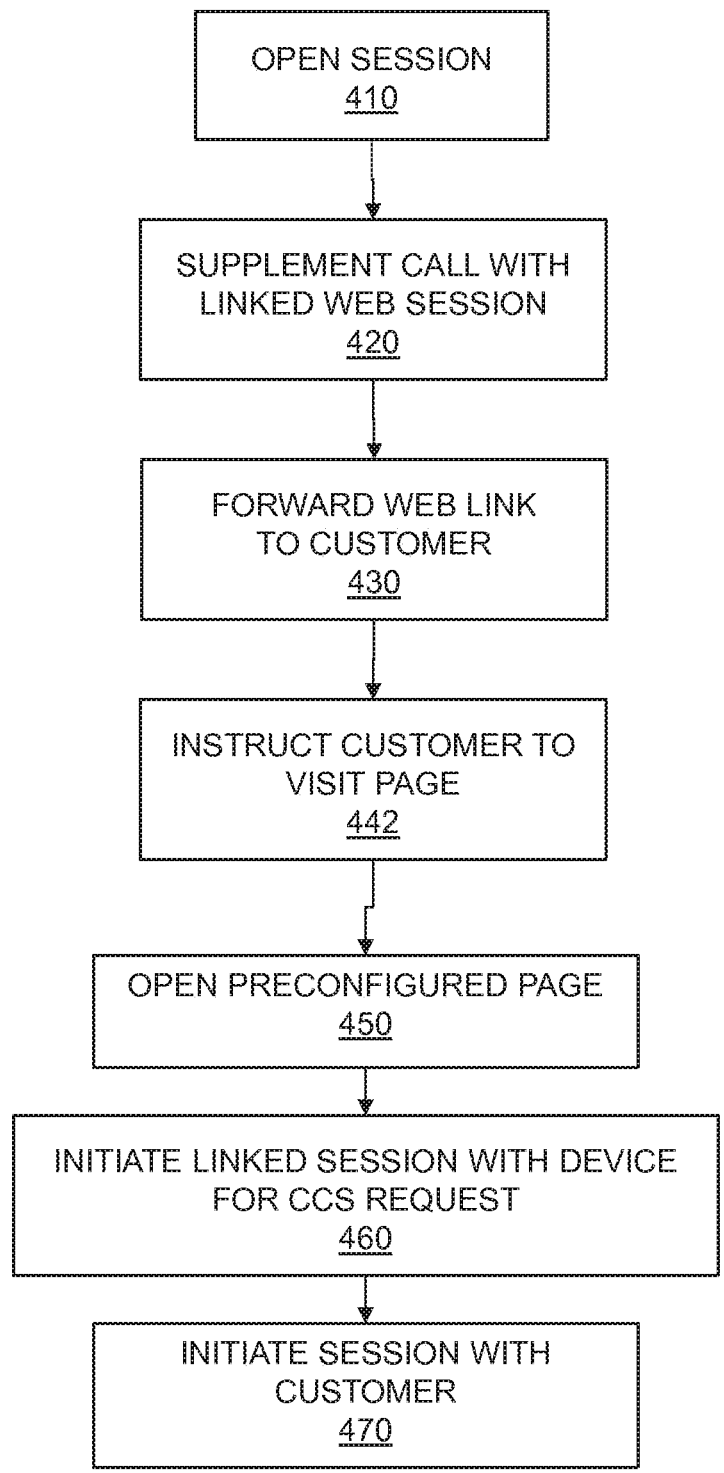
FIG. 4 is a first flow diagram that shows the diversion of callers to Web sessions according to the invention.

FIG. 4 is a first flow diagram that shows the diversion of callers to Web sessions according to the invention. In FIG. 4, a session is opened (410) and, in accordance with the discussion above, a determination is made to supplement the call with a linked Web session (420). A Web link is forwarded to the customer (430) and, depending upon the circumstances, the customer is instructed to visit a Web page (442). When the customer lands on the Web page, a preconfigured page is opened for the customer (450) and a linked session is initiated with the customer device for a CCS request (460). Thereafter, the session is initiated with the customer (470).

Figure 5:
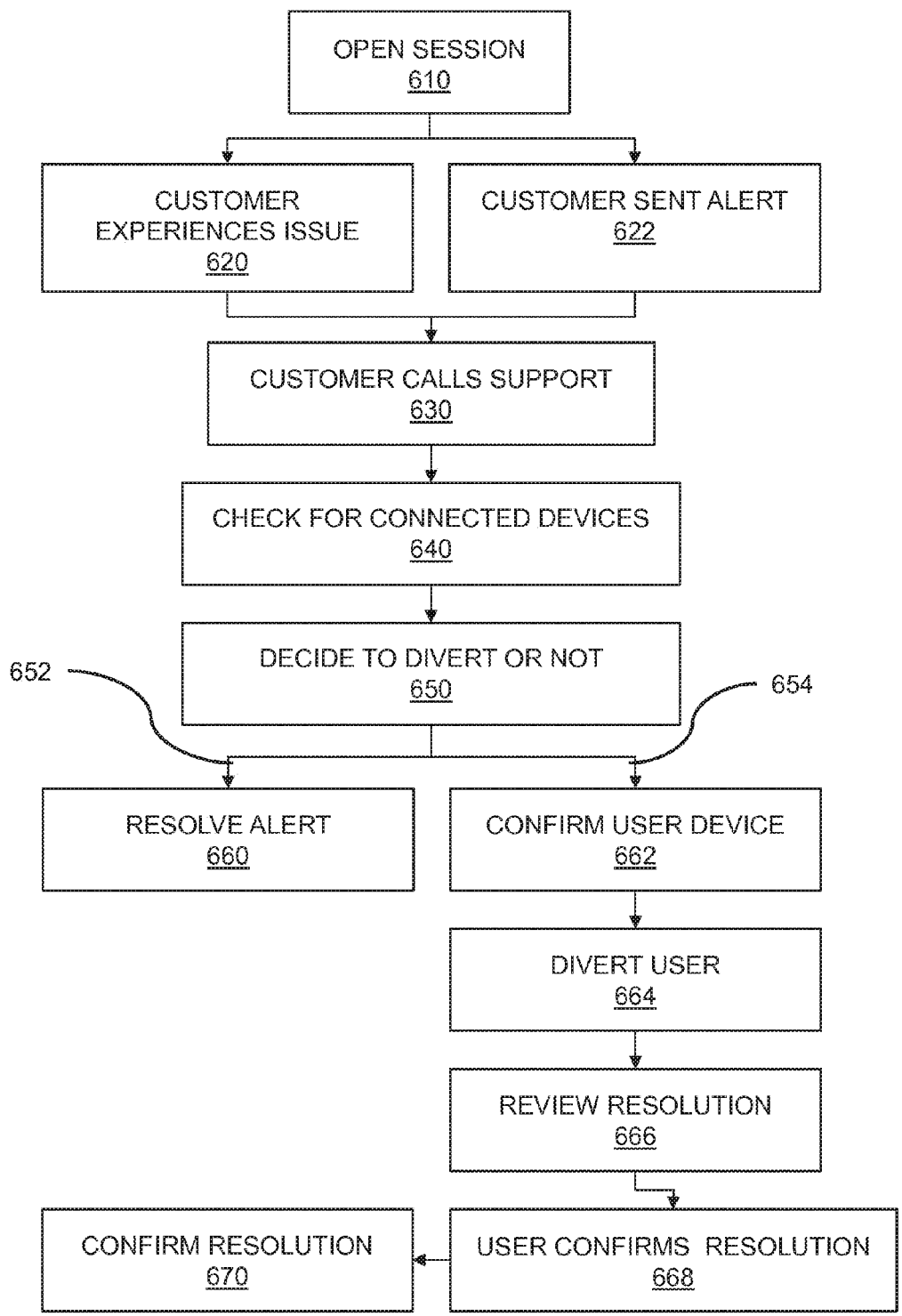
FIG. 5 is a second flow diagram that shows the diversion of callers to Web sessions according to the invention.

FIG. 5 is a second flow diagram that shows the diversion of callers to Web sessions according to the invention. In FIG. 5, a session is opened (610) based upon whether the customer experiences an issue (620) or in response to an alert sent to the customer (622). The customer calls a support number (630) and the system checks for connected devices (640). A decision is made whether or not to diver the call (650). If the alert is resolvable (652), then the alert is resolved (660); if the alert cannot be resolved at this point (654), then the system confirms the customer device (662), diverts the user (654), and provides for review of the resolution (666). The user confirms resolution (668) and the system then confirms resolution (670).

IVR

Figure 6:
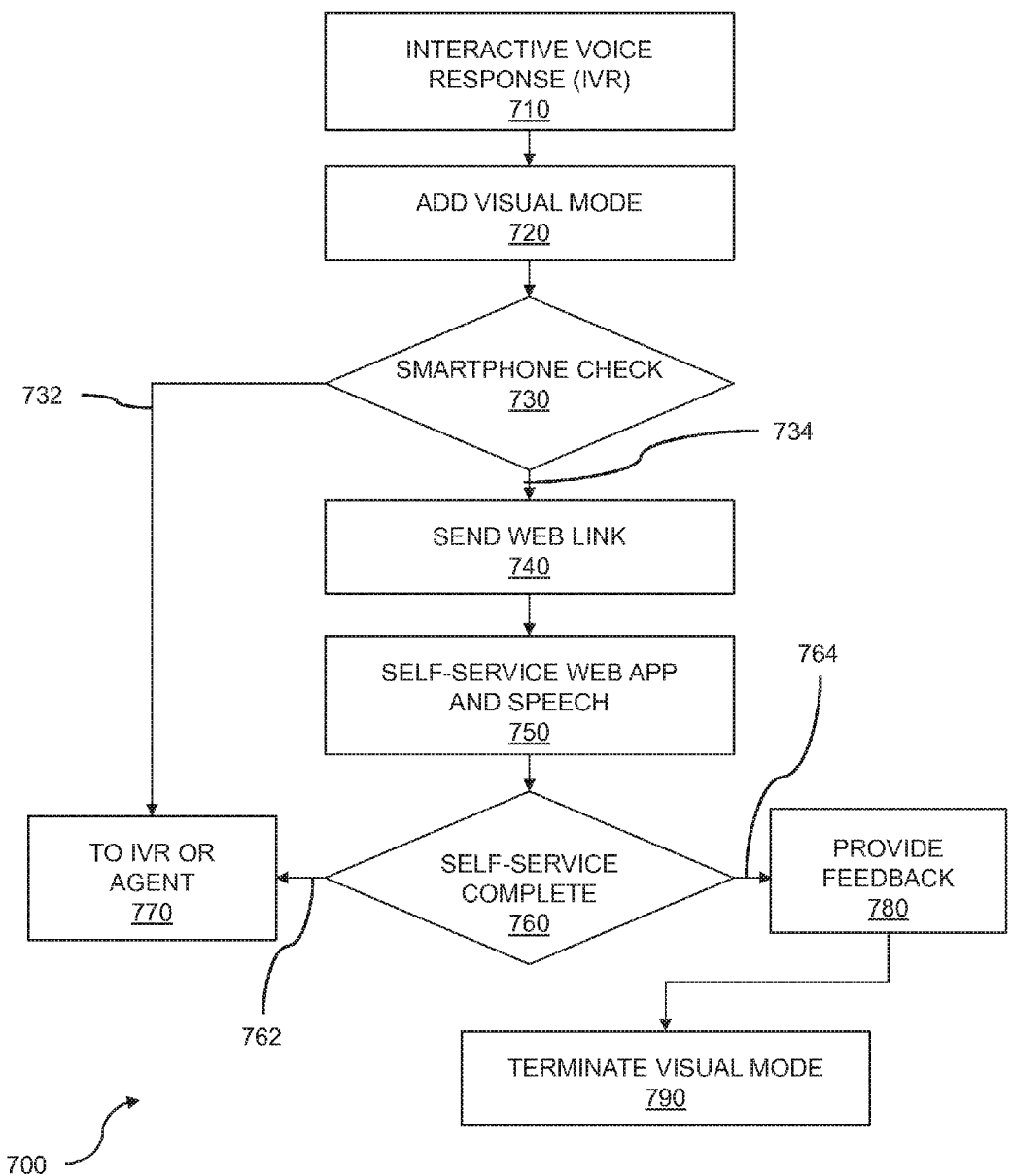
FIG. 6 is a flow diagram that shows an interactive voice response (IVR) session according to the invention.

FIG. 6 is a flow diagram that shows an interactive voice response (IVR) session (700) according to the invention. In FIG. 7, the customer accesses an IVR system (710) and a visual mode is added to the customer session (720). The system checks that the customer has a smartphone (730) that can handle the visual mode of operation. If the customer does not have a smartphone (732), the customer is sent to an IVR session or live agent (770); if the customer has a smartphone (734), a Web link is sent to the customer (740) and the customer follows the link to access a self-service Web application and speech recognition system (750). When the self-service session is complete (760), if self-service is not successful (762), the customer is sent to an IVR session or live agent (770); if self-service is successful (764), then the customer is provided with an opportunity to leave feedback (780) and the visual mode is terminated (790).

Screen Shots

Figure 7A:
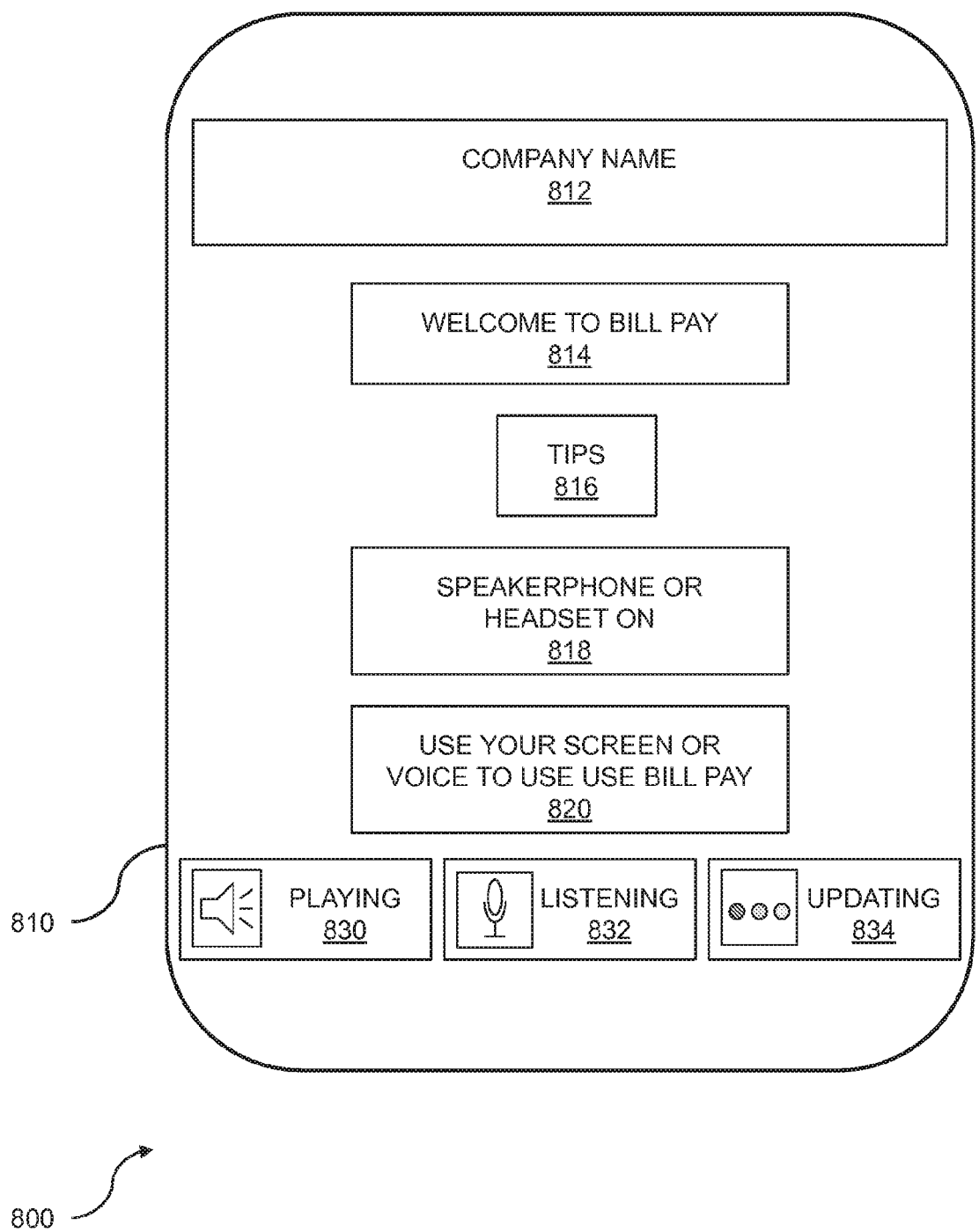
FIGS. 7A and 7B show example screen shots that can be provided to, and displayed for, the user.
Figure 7B:
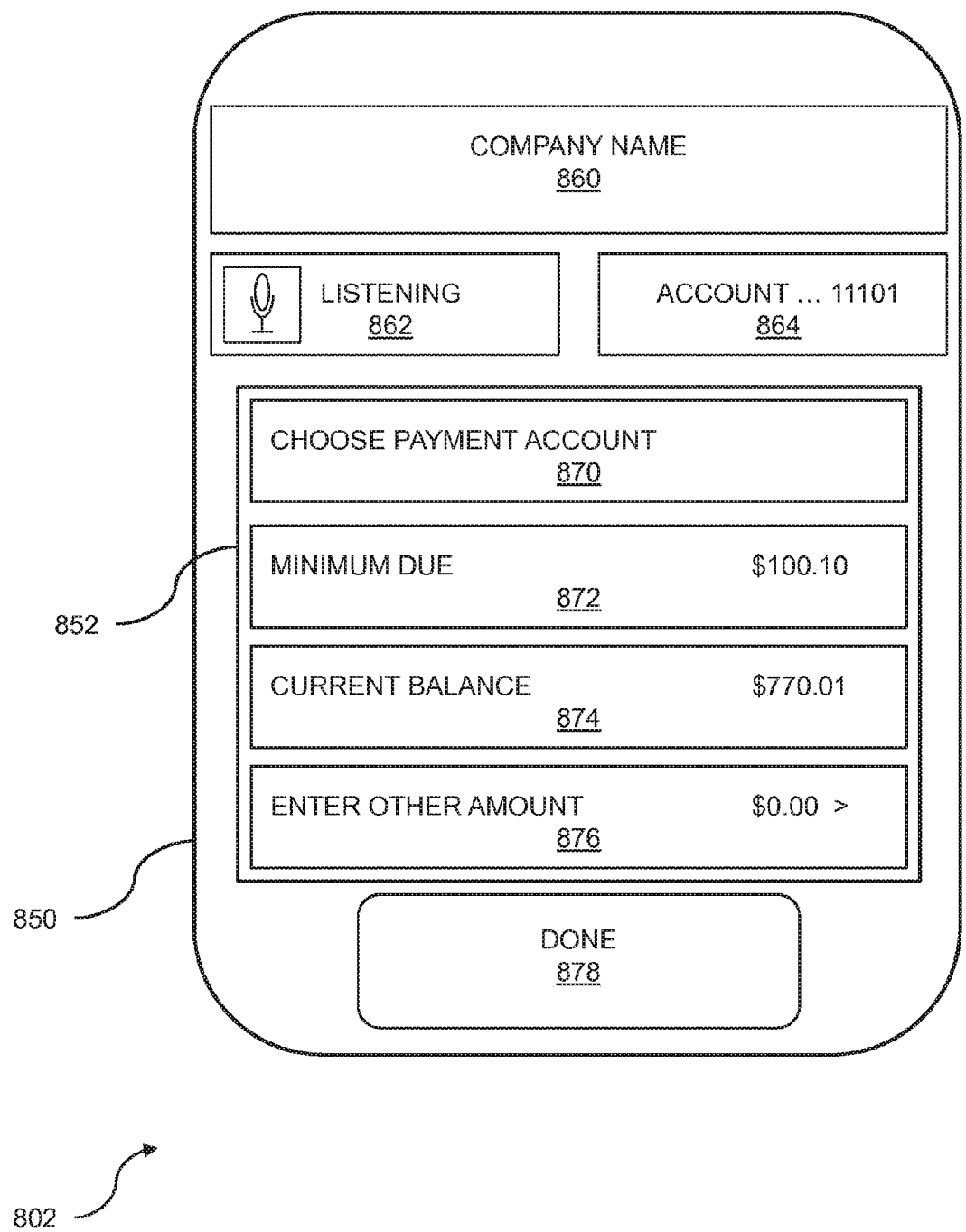

FIGS. 7A and 7B show example screen shots that can be provided to, and displayed for, the user. The screen shots may be part of an application, a website, a Web app, and so on.

FIG. 7A shows an example welcome screen shot 800. The welcome screen 810 may be shown on any appropriate user device including home devices, portable devices, mobile devices, and the like. For example, a welcome screen may be displayed on a smartphone, laptop computer, tower computer, tablet, TV, mobile device, projector, and so on. A welcome screen may include visuals to identify the company with which a user is communicating. For example, a company may choose to display the company name 812, a logo, an animation, or the like. The company name may be a static visual, a link to a company web page, or something similar. Other types of information may be displayed as images, buttons, or animations. For example, a welcome banner 814 may be displayed. Similarly, information buttons such as, "Use your screen or voice to use bill pay" 820 may be displayed. The buttons may perform actions, connect to other sites, and so on. For example, a Tips button 816 may be shown. When selected by touching, tapping, clicking, etc. the user may be shown useful information about how to use and interact with the displayed interface. Other buttons may perform useful actions. For example, touching, tapping, clicking, etc. 818 may allow the user to turn on a speakerphone, enable a headset, and so on. Other useful buttons may be included which display useful information, select or deselect options, and so on. For example, Playing 830 may indicate that an audio signal is being or can be presented to a user. In addition, Listening 832 may indicate that the user's microphone is live and is enabling communication with an interactive voice recognition system or a customer support representative, for example. Similarly, Updating 834 may indicate that some activity is taking place and has not yet completed.

FIG. 7B shows an example payment application 802. A screen 850 may be displayed on any appropriate user device including home devices, portable devices, mobile devices, and the like. For example, an application screen may be displayed on a smartphone, laptop computer, tower computer, tablet, PDA, TV, mobile device, projector, and so on. As before, the visual information presented on a screen may include company information, buttons, images, animations, and so on. Example application screen 850 includes company information 860, a sub-window 852 for grouping useful visual information in an easy to find manner, and status buttons such as listening 862 and account number 864. Other buttons may be included to perform useful tasks. Example buttons shown include a Choose Payment Account button 870, and options buttons for, in this example, paying a bill. For example, a user may choose to pay a minimum amount by selecting button 872. Alternatively, a user may choose to pay a current balance amount 874, or may choose to enter another amount 876. When a transaction is complete, the user may leave a screen for another screen or application by selecting the Done button 878.

The displayed information may be any appropriate type for presenting visuals to a user. Many other types of visuals may be presented. The visuals may be presented as various types of screen data such as buttons, graphics, figures, animations, and so on. The screens may be appropriate for communicating with a user, for capturing data from the user, and so on. For example, visual information may be presented to a user in order to capture user feedback, transaction rating information, customer satisfaction information, and so on. Visual information may indicate that various communications modes are available to a user. For example, visuals may indicate that a user may communicate via voice or by selecting buttons on a screen. Further, visuals may indicate that a user may communicate via email, SMS, chat, and so on. The various visual communications can be synchronized with corresponding audio communications.

Computer Implementation

Figure 8:
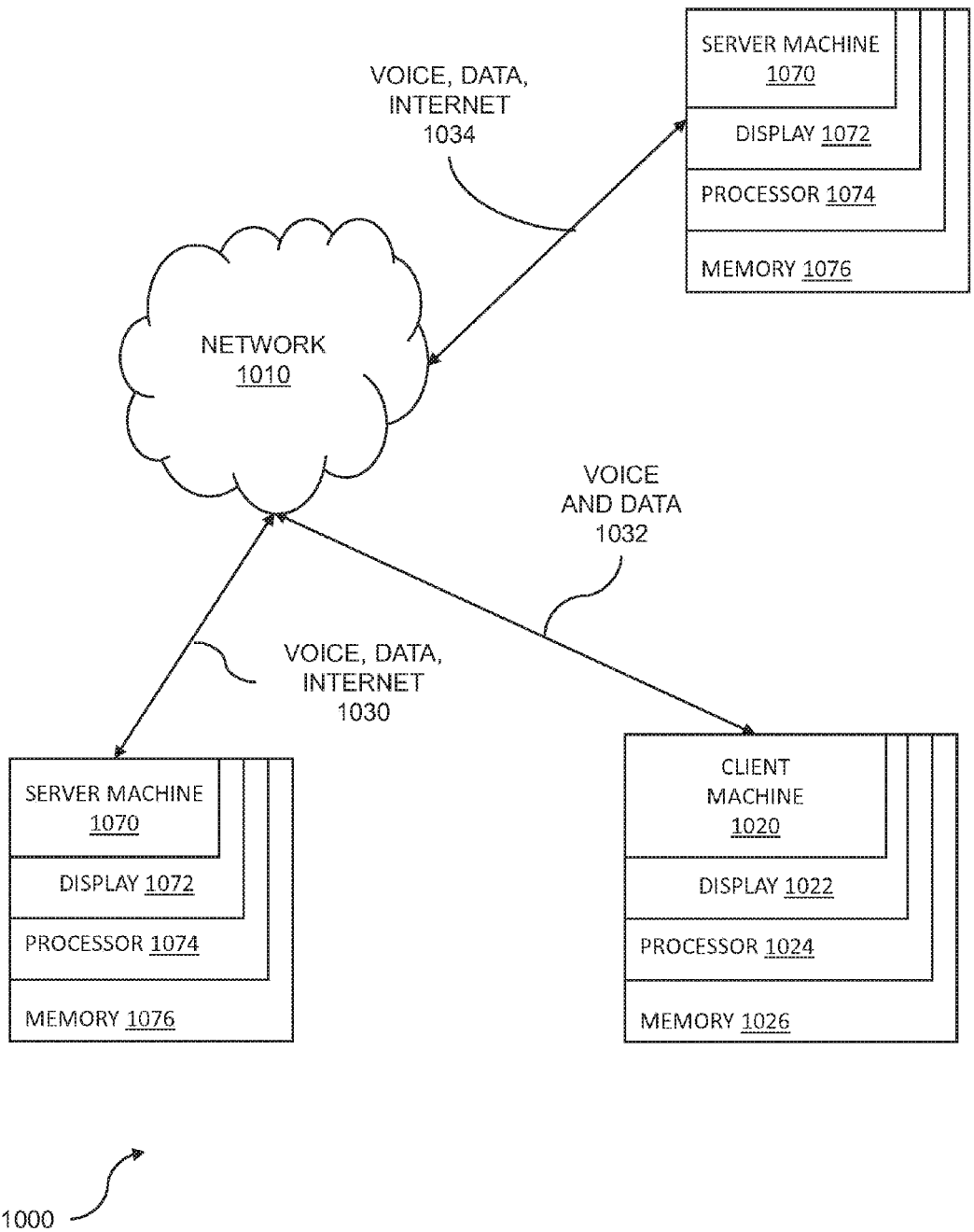
FIG. 8 is a block schematic diagram that depicts a system architecture that includes a machine in the exemplary form of a computer system within which a set of instructions for causing the machine to perform any of the herein disclosed methodologies may be executed.

FIG. 8 is a block schematic diagram that depicts a system architecture 1000 in which a machine in the exemplary form of a computer system within which a set of instructions for causing the machine to perform any of the herein disclosed methodologies may be executed. In FIG. 9, one or more server machines 1070 includes a display 1072, processor 1074, and memory 1076; and one or more client machines 1020 include a display 1022, processor 1024, and memory 1026. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken. The server machines and client machines exchange information over a network 1010 via communications links which, in FIG. 9, convey voice, data, and Internet information for the server machines, i.e. via links 1030, 1034, and which convey voice and data information for the client machines, i.e. via link 1032.

As discussed above, each of the server machines and client machines comprise a computer system that includes a processor, a main memory, and a static memory, which communicate with each other via a bus. The computer system may further include a display unit. The computer system also includes an alphanumeric input device, for example, a keyboard; a cursor control device, for example, a mouse; a disk drive unit, a signal generation device, for example, a speaker, and a network interface device.

A disk drive unit that can be included with each of the service machines and client machines includes a machine-readable medium on which is stored a set of executable instructions, i.e. software, embodying any one, or all, of the methodologies described herein. The software resides, completely or at least partially, within the main memory and/or within the processor. The software may further be transmitted or received over the network by means of a network interface device.

In contrast to the computer system discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC). Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core, such as the CPU of a computer, or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the invention. Accordingly, the invention should only be limited by the Claims included below.

The invention claimed is:

1. A computer implemented method for synchronizing calls with Web sessions, comprising:
   a processor associated with a customer care support (CCS) facility receiving a query from a customer pursuant to an ongoing non-visual session;
   said processor associated with said CCS performing a process of:
      automatically detecting a connected device that a customer can access at the moment,
      if there are one or more devices that said customer can access at the moment, predicting a type of at least one of the connected devices to which synchronized calls with Web session can be delivered based on previous interaction that said customer had with said CCS; and
   said processor associated with said CCS delivering information visually to said customer via said connected device.

2. The method of claim 1, wherein the process performed by said CCS further includes:
   if no connected device is automatically detected, checking with the customer on devices that said customer can access at the moment.

3. The method of claim 1, wherein the delivering information visually is synchronized with communication of the non-visual session.

4. The method of claim 1, wherein the non-visual session includes an audio session.

5. The method of claim 1, further comprising:
   said processor associated with said CCS offering said customer an option of receiving service over a Web session, as well as voice, by sending a link to said customer by which said customer can access additional content if said customer can access a connected device.

6. The method of claim 5, further comprising:
   in response to said customer exercising said option and selecting said service, said processor associated with said CCS initiating a Web session and linking said Web session with said ongoing non-visual session by any of:
   said processor associated with said CCS sending a link to said customer by any of email, SMS, instant message, or any other digital communication that, when selected by said customer, initiates a linked session;
   said processor associated with said CCS playing a message that directs said customer to a personalized Web page that initiates a linked session;
   said processor associated with said connected device used by said customer to place a call initiating a linked session in response to a CCS request;
   responsive to a device registered by said customer with said processor associated with said CCS initiating a linked session in response to a CCS request, said processor initiating a session with said customer via a mobile device and linking said mobile device in response to receipt of identifying information.

7. The method of claim 6, further comprising any of:
   a wireless carrier or Internet service provider (ISP) configuring a mobile device to open a specific Web page based on a number called, wherein said customer's mobile number is passed to said Web page in a request, or said Web page prompts said customer to enter a mobile number, to link a customer call to a Web session; and
   downloading a third party app to said customer's mobile device, wherein said processor associated with said CCS sends a notification to said third party app and, upon receiving notification of said customer launching said third party app, said third party app making a data request to said third party to be linked to a CCS session;
   wherein upon launching of an app installed on a mobile device, said customer is prompted for identifying information, and wherein said processor associated with said CCS then links a session with a recent or current CCS session for the same customer.

8. A computer implemented method for synchronizing calls with Web sessions, comprising:
   receiving information concerning a customer experiencing an issue or being alerted about an issue through a communication medium;
   in response to such situation, a customer care support (CCS) facility receiving a call from a customer to engage in voice interaction to resolve said alert;
   a processor associated with said CCS checking for available connected devices that a user can access at the moment;
   said processor associated with said CCS deciding whether supplementing said call with a Web session is necessary depending on the nature of content that said CCS has to use to support said customer;
when said alert can be resolved via said call, then said processor associated with said CCS resolving said alert;
when said customer can be better served using visual content, then said processor associated with said CCS confirming said customer's device and supplementing said call accordingly by automatically establishing the linked Web session that is synchronized with communication of the call;
receiving from the customer a confirmation of resolution of said issue; and
said processor associated with said CCS confirming said issue as resolved.

9. The method of claim 8, wherein the linked Web session is automatically established for communication with the customer care support (CCS) facility that delivers information visually to a customer's device.

10. The method of claim 8, wherein when said customer can be better served using visual content and said customer has a smart phone, said processor associated with said CCS sending a Web link to said customer which initiates a linked session in which said customer can access said visual content.

11. The method of claim 8, wherein said issue comprises confirming authentication of a customer when received by an interactive voice response system (IVR) or voice agent;
said processor associated with said CCS supplementing said customer call from said IVR or voice agent with an online or mobile Web session; and
said processor associated with said CCS receiving authentication information from said customer via said online or mobile Web session;
wherein said authentication information is securely entered.

12. The method of claim 8, wherein said issue comprises a voice recognition conversation including information that is difficult for an IVR system or voice agent to identify during an ongoing communication with said IVR system or voice agent;
said processor associated with said CCS handing off or supplementing said customer call from said IVR or voice agent to an online or mobile Web session;
said processor associated with said CCS receiving said information by non-voice customer entry via said online or mobile Web session; and
once said information is entered, said processor associated with said CCS permitting said IVR system or live agent conversation to continue.

13. The method of claim 8, further comprising:
said processor associated with said CCS supplementing said call with a Web session and discontinuing said call interaction.

14. The method of claim 8, further comprising:
responsive to said customer starting a chat session and placing a call at the same time, said processor associated with said CCS receiving identifying information of said customer that links said chat session and said call in response to any of receiving a call number said customer entered in said chat session, or receiving an account number said customer entered in both said chat session and said call.

15. An apparatus for synchronizing calls to Web sessions, comprising:
a processor associated with a customer care support (CCS) facility and configured for receiving a query from a customer pursuant to an ongoing non-visual session;
said processor configured for performing a process of:
automatically detecting a connected device that a customer can access at the moment,
if there are one or more devices that said customer can access at the moment, predicting a type of at least one of the connected devices to which synchronized calls with Web session can be delivered based on previous interaction that said customer had with said CCS, and
said processor configured delivering information visually to said customer via said connected device; and
said processor configured for offering said customer an option of receiving service over a Web session, as well as a voice session, by sending an email link to said customer by which said customer can access additional content if said customer can access a connected device.

16. The apparatus of claim 15, wherein the process further includes:
if no connected device is automatically detected, checking with the customer on devices that said customer can access at the moment.

17. The apparatus of claim 15, wherein communication of the Web session is synchronized with communication of the voice session.

18. The apparatus of claim 15, further comprising:
responsive to said customer exercising said option and selecting said service, said processor configured for initiating a Web session and linking said Web session with said ongoing non-visual session by any of:
said processor configured for sending a link to said customer by any of email, SMS, instant message, or any other digital communication that, when selected by said customer, initiates a linked session;
said processor configured for playing a message that directs said customer to a personalized Web page that initiates a linked session;
said processor associated with said connected device used by said customer to place a call configured for initiating a linked session in response to a CCS request;
a device registered by said customer with said processor initiating a linked session in response to a CCS request; and
in response to said customer initiating a session on a mobile device and linking said mobile device by entering identifying information.

19. The apparatus of claim 15, wherein the processor is configured to generate control information for controlling a web browser running on the connected device of said customer during the Web session.

20. The apparatus of claim 15, wherein the processor is configured to generate a visual map, the visual map identifies locations where past transactions of said customer occurred.

* * * * *